(12) United States Patent
Honda et al.

(10) Patent No.: US 9,605,977 B2
(45) Date of Patent: Mar. 28, 2017

(54) ROTATION POSITION DETECTION DEVICE

(71) Applicant: DENSO CORPORATION, Kariya, Aichi-pref (JP)

(72) Inventors: Hitomi Honda, Kariya (JP); Akitoshi Mizutani, Kariya (JP); Yoshiyuki Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/922,375

(22) Filed: Oct. 26, 2015

(65) Prior Publication Data

US 2016/0123767 A1    May 5, 2016

(30) Foreign Application Priority Data

Nov. 4, 2014    (JP) .................. 2014-224082

(51) Int. Cl.
*G01R 33/04* (2006.01)
*G01V 3/00* (2006.01)
*G01D 5/14* (2006.01)

(52) U.S. Cl.
CPC .................. *G01D 5/145* (2013.01)

(58) Field of Classification Search
CPC .................. G01D 5/12; G01D 5/145
USPC .................. 324/207.25, 253, 318
See application file for complete search history.

(56) References Cited

U.S. PATENT DOCUMENTS

| | | | | |
|---|---|---|---|---|
| 5,233,295 A | * | 8/1993 | Murata et al. | G01B 7/06 123/146.5 A |
| 2010/0289442 A1 | * | 11/2010 | Hatano | H02K 11/215 318/400.38 |
| 2014/0184204 A1 | | 7/2014 | Kouno et al. | |

* cited by examiner

*Primary Examiner* — Farhana Hoque
(74) *Attorney, Agent, or Firm* — Nixon & Vanderhye P.C.

(57) ABSTRACT

A first opposing surface of a first yoke has a constant radius of curvature and has a center of curvature that lies on a center of rotation. At least two rotation direction end portions of a second opposing surface of the second yoke are formed such that toward either end in the rotation direction, the two end portions are increasingly spaced away from a reference curved surface in a direction away from the first opposing surface. The first and second opposing surfaces face each other to define a gap therebetween. Accordingly, the gap between the yokes is wider at its end portions than at its center, and increases in magnetic flux density flowing through a Hall element is curtailed at the end portions of the gap. Further, it is not necessary for the first yoke to protrude outward when widening the end portions of the gap.

4 Claims, 4 Drawing Sheets

ROTATION POSITION DETECTION DEVICE

CROSS REFERENCE TO RELATED APPLICATION

The present application is based on Japanese Patent Application No. 2014-224082 filed on Nov. 4, 2014, disclosure of which is incorporated herein by reference.

TECHNICAL FIELD

The present disclosure relates to a rotation position detection device that detects a rotation position of a detection target.

BACKGROUND

It is known that magnetic-type rotation position detection devices are able to detect a rotation position of a detection target that moves relative to a reference member. This type of rotation position detection device includes two magnets (or "magnetic flux generators") and two yokes (or "magnetic flux carriers") that form a closed magnetic circuit, and a magnetic flux density detection unit (e.g., a Hall element) disposed within the closed magnetic circuit. For example, the magnets and yokes may be disposed on the detection target, and the magnetic flux density detection unit may be disposed on the reference member. Magnetic flux density passing through the magnetic flux density detection unit changes according to the position of the magnetic flux density detection unit with respect to the yokes. As such, the rotation position detection device detects the rotational position of the detection target based on the magnetic flux density passing through the magnetic flux density detection unit.

For example, JP 2014-126548 A discloses a position detection device that includes an inner yoke and an outer yoke, the inner yoke being disposed radially inward of the outer yoke. The inner yoke is shaped such that toward either end in a rotational direction, the inner yoke is increasingly displaced radially inward and spaced away from a trajectory of a Hall element. Further, the outer yoke is shaped such that toward either end in the rotational direction, the outer yoke is increasingly displaced radially outward and spaced away from the trajectory of the Hall element. Accordingly, a gap between the two yokes is greater at the ends of the yokes than at the centers of the yokes, and increases in magnetic flux density flowing to the Hall element may be curtailed at the end portions of the gap. As a result, linearity of the output signal from the Hall sensor may be improved, i.e., a relationship between the rotational position of the detection target and the magnetic flux density passing through the Hall element may approach a linear relationship.

SUMMARY

However, in the position detection device of JP 2014-126548 A, in order to increase the gap between the end portions of the yokes, the end portions of the inner yoke are configured to protrude radially inward, and the end portions of the outer yoke are configured to protrude radially outward. Accordingly, there may be concerns regarding mounting constraints at the inner and outer sides of the position detection device. For example, if a shaft is disposed inward of the position detection device, the inner yoke may interfere with the shaft, and thus the entire position detection device may need to be moved outward. Further, if the yokes are resin-molded, it may be difficult to keep the thickness of the resin mold consistent at the end portions of the yokes.

In view of the above, it is an object of the present disclosure to provide a rotation position detection device that improves linearity of an output signal of a magnetic flux density detection unit and, at the same time, maintain mountability of the rotation position detection device According to the present disclosure, there is provided a rotation position detection device that includes a first magnetic flux carrier, a second magnetic flux carrier, a flux magnetic flux generator, a second magnetic flux generator, and a magnetic flux density detection unit. The first magnetic flux carrier extends in a rotation direction of a detection target. The second magnetic flux carrier extends in the rotation direction so as to face the first magnetic flux carrier in a radial direction which is a direction orthogonal to a center of rotation of the detection target, the first magnetic flux carrier and the second magnetic flux carrier being attached together to one of a reference member and the detection target. The first magnetic flux generator is disposed between one end portion of the first magnetic flux carrier and one end portion of the second magnetic flux carrier. The second magnetic flux generator is disposed between an other end of the first magnetic flux carrier and an other end of the second magnetic flux carrier. The magnetic flux density detection unit outputs a signal according to a magnetic flux density passing therethrough, the magnetic flux density detection unit being positioned in a gap between the first magnetic flux carrier and the second magnetic flux carrier and being attached to an other of the reference member and the detection target.

Here, a first opposing surface of the first magnetic flux carrier is defined as a surface that faces the second magnetic flux carrier and that outlines the gap. A second opposing surface of the second magnetic flux carrier is defined as a surface that faces the first opposing surface and that outlines the gap. A reference curved surface is defined as an imaginary curved surface having a constant radius of curvature and having a center of curvature that lies on the center of rotation, the reference curved surface passing through a rotation direction center of the second opposing surface.

The first opposing surface is a curved surface having a constant radius of curvature and having a center of curvature that lies on the center of rotation. At least both end portions of the second opposing surface in the rotation direction are formed such that toward either end in the rotation direction, the both end portions of the second opposing surface are increasingly spaced away from the reference curved surface in a direction away from the first opposing surface.

As a result of such a configuration, the gap between the magnetic flux carriers is wider at its end portions than at its center in the rotation direction. Thus increases in the magnetic flux density flowing through the magnetic flux density detection unit is curtailed at the end portions of the gap. Accordingly, the linearity of the output signal from the magnetic flux density detection unit is improved.

Further, it is not necessary for the first magnetic flux carrier to protrude inward or outward when widening the gap between the end portions of the magnetic flux carriers. In other words, only the second magnetic flux carrier protrudes in the radial direction. For this reason, it is possible to avoid mounting constraints at one of the inner side and the outer side of the rotation position detection device, thereby improving mountability.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
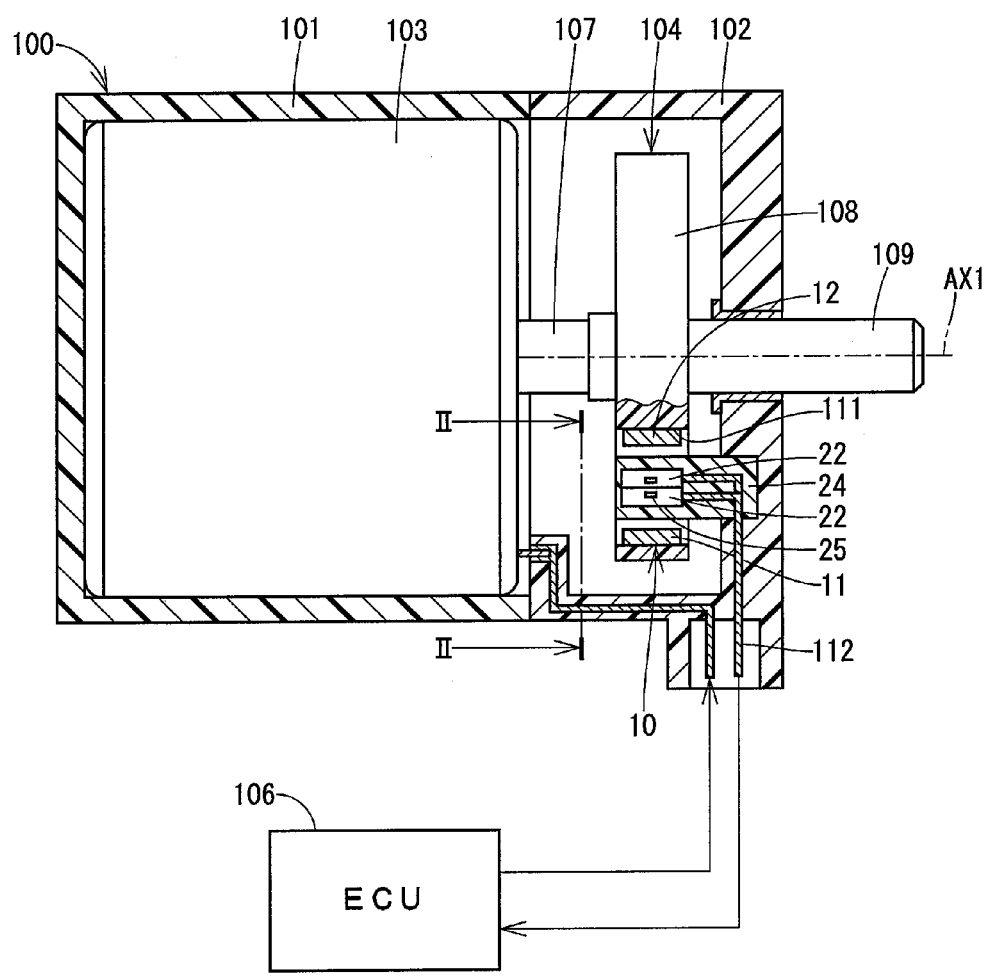
FIG. 1 is a view showing an outline configuration of a rotary type actuator that includes a rotation position detection device.

Hereinafter, several embodiments of the present disclosure will be explained with reference to the figures. Components and configurations which are substantially the same between each embodiment are denoted with the same reference numerals, and explanations thereof are omitted for brevity.

First Embodiment

A rotation position detection device 10 according a first embodiment of the present disclosure is disposed on a rotary actuator 100 shown in FIG. 1.

First, the overall configuration of the rotary actuator 100 will be explained with reference to FIG. 1.

The rotary actuator 100 includes a housing 101, a casing 102, a motor 103, and output member 104, and the rotation position detection device 10.

The housing 101 and the casing 102 are fixed to a vehicle frame or a component attached to the vehicle frame.

The output member 104 includes an output rotating body 108 and an output shaft 109. The output rotating body 108 is connected to a motor shaft 107. Further, the output shaft 109 is rotatably supported by the casing 102, and integrally rotates with the output rotating body 108. Moreover, the output rotating body 108 includes an arc-shaped throughhole 111 that is positioned away from a center of rotation AX1 and extends in a circumferential direction.

The rotation position detection device 10 is disposed in the throughhole 111 of the output rotating body 108, and detects a relative rotational position (i.e., a rotation angle) of the output rotating body 108 with respect to the casing 102. Specifically, the rotation position detection device 10 is electrically connected to an electronic control unit 106 through a signal terminal 112, and outputs an output signal corresponding to the rotation position of the output rotating body 108. Accordingly, in the present embodiment, the casing 102 corresponds to a "reference member", and the output rotating body 108 corresponds to a "detection target".

Next, the basic configuration of the rotation position detection device 10 will be explained with reference to FIGS. 1 and 2.

In the following explanation, the direction in which the output rotating body 108 rotates is referred to as a "rotation direction". Further, a direction orthogonal to the center of rotation AX1 of the output rotating body 108 is referred to as a "radial direction".

The rotation position detection device 10 includes a first yoke 11, a second yoke 12, a first magnet 13, a second magnet 14, and a Hall integrated circuit (IC) 22.

The first yoke 11 is formed from a magnetic material and is fixed to the output rotating body 108 within the throughhole 111. Further, the first yoke 11 extends in the rotation direction of the output rotating body 108. In the present embodiment, the first yoke 11 corresponds to a "first magnetic flux carrier".

The second yoke 12 is formed from a magnetic material and is fixed to the output rotating body 108 within the throughhole 111. Further, the second yoke 12 extends in the rotation direction of the output rotating body 108 and faces the first yoke 11 in the radial direction. In the present embodiment, the second yoke 12 corresponds to a "second magnetic flux carrier". Further, in the present embodiment, the second yoke 12 is disposed radially inward of the first yoke 11.

The first magnet 13 is disposed between one end portion 16 of the first yoke 11 and one end portion 17 of the second yoke 12. Further, the first magnet 13 is magnetized such that an N-pole is positioned radially outward and an S-pole is positioned radially inward. In the present embodiment, the first magnet 13 corresponds to a "first magnetic flux generator".

The second magnet 14 is disposed between an other end portion 18 of the first yoke 11 and an other end portion 19 of the second yoke 12. Further, the second magnet 14 is magnetized such that an N-pole is positioned radially inward and an S-pole is positioned radially outward. In the present embodiment, the second magnet 14 corresponds to a "second magnetic flux generator".

The first yoke 11 connects the N-pole of the first magnet 13 with the S-pole of the second magnet 14. The second yoke 12 connects the S-pole of the first magnet 13 with the N-pole of the second magnet 14. A circular closed magnetic circuit is formed by the first yoke 11, the second yoke 12, the first magnet 13, and the second magnet 14 along the inner wall of the throughhole 111. Here, the first yoke 11 faces the second yoke 12 in the radial direction. Further, an arc-shaped gap 21 that extends in the rotation direction is defined between the first yoke 11 and the second yoke 12.

The magnetic flux from the N-pole of the first magnet 13 includes circulation magnetic flux that flows through the first yoke 11 to the S-pole of the second magnet 14, leakage magnetic flux that flows from the first yoke 11 to the second yoke 12 through the gap 21, and direct magnetic flux that flows through the gap 21 to the S pole of the first magnet 13 without passing through the first yoke 11 or the second yoke 12.

The magnetic flux from the N-pole of the second magnet 14 includes circulation magnetic flux that flows through the second yoke 12 to the S-pole of the first magnet 13, leakage magnetic flux that flows from the second yoke 12 to the first yoke 11 through the gap 21, and direct magnetic flux that flows through the gap 21 to the S pole of the second magnet 14 without passing through the first yoke 11 or the second yoke 12.

The Hall IC 22 is disposed in the gap 21, and is fixed to the casing 102 by a mold member 24. Further, the Hall IC 22 includes a Hall element 25. The Hall element 25 is a magneto-electric transducer that uses the Hall effect and outputs a signal according to the magnetic flux density passing through a magnetic sensitive surface. In the present embodiment, the Hall element 25 corresponds to a "magnetic flux density detection unit".

Next, details of the rotation position detection device 10 will be explained with reference to FIGS. 2 and 3.

In the following explanation, a first opposing surface 31 of the first yoke 11 is defined as a surface facing the second yoke 12 and outlining the gap 21. Similarly, a second opposing surface 32 of the second yoke 12 is defined as a surface facing the first yoke 11 and outlining the gap 21. Further, a reference curved surface BC1 is defined as an imaginary curved surface with a constant radius of curvature that passes through a rotation direction center 33 of the second opposing surface 32. Here, the center of curvature of the reference curved surface BC1 is on the center of rotation AX1. In addition, a center line CL1 is defined as an imaginary line that lies on a cross-section orthogonal to the center of rotation AX1 (e.g., the plane of FIG. 2) and that connects the center of rotation AX1 with the center 33 of the second opposing surface 32.

Figure 2:
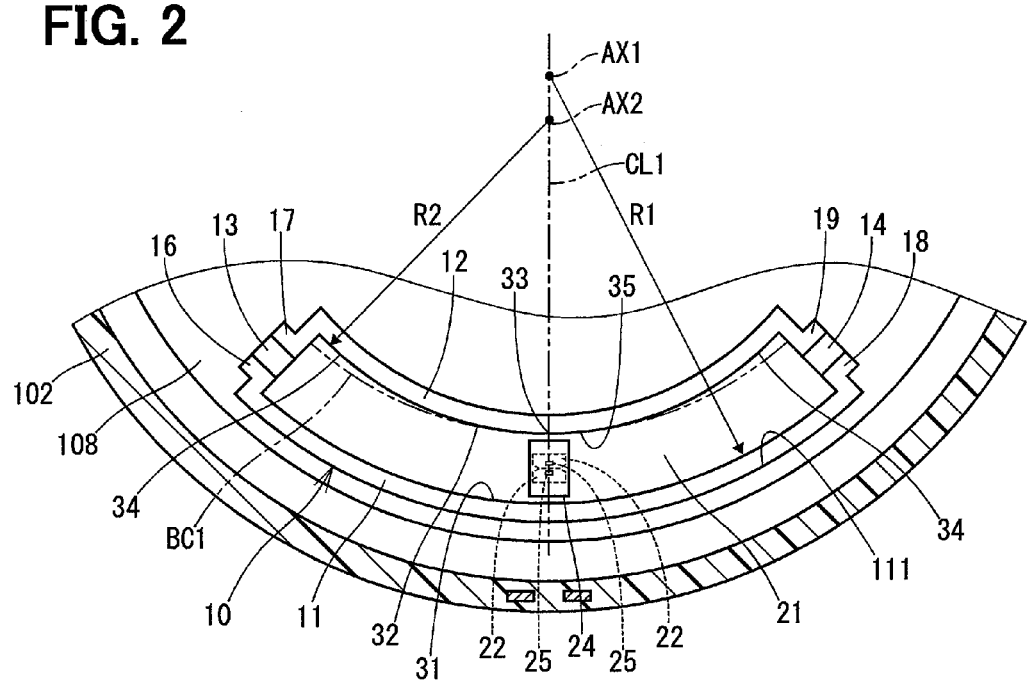
FIG. 2 is a cross-sectional view along the II-II line of FIG. 1.

As shown in FIG. 2, the first opposing surface 31 is formed as a curved surface having a constant radius of curvature R1. Further, the center of curvature of the first opposing surface 31 lies on the center of rotation AX1. The portions of the first yoke 11 corresponding to the first opposing surface 31 have a constant radial cross-sectional area along the rotation direction.

The second opposing surface 32 includes two end portions 34 and a center portion 35. The entirety of the second opposing surface 32 is shaped so that toward either end in the rotation direction, the second opposing surface 32 is increasingly spaced away from the reference curved surface BC1 in a direction away from the first opposing surface 31. In the present embodiment, the second opposing surface 32 is formed as a curved surface having a constant radius of curvature R2 and having a center of curvature AX2 on the center line CL1. Specifically, the center of curvature AX2 is spaced away from the center of rotation AX1 in a direction toward the first opposing surface 31. The portions of the second yoke 12 corresponding to the second opposing surface 32 have a constant radial cross-sectional area along the rotation direction.

The magnetic flux density passing through the Hall element 25 tends to sharply change due to effects of the direct magnetic flux flow at the end portions of the gap 21 between the yokes. For this reason, in the present embodiment, the width of the gap 21 in the radial direction is increasingly widened in a direction from the center of the gap 21 to the end portions of the gap 21, i.e., along the rotation direction. As a result, increases in the magnetic flux density flowing through the Hall element 25 is curtailed at the end portions of the gap 21.

Figure 3:
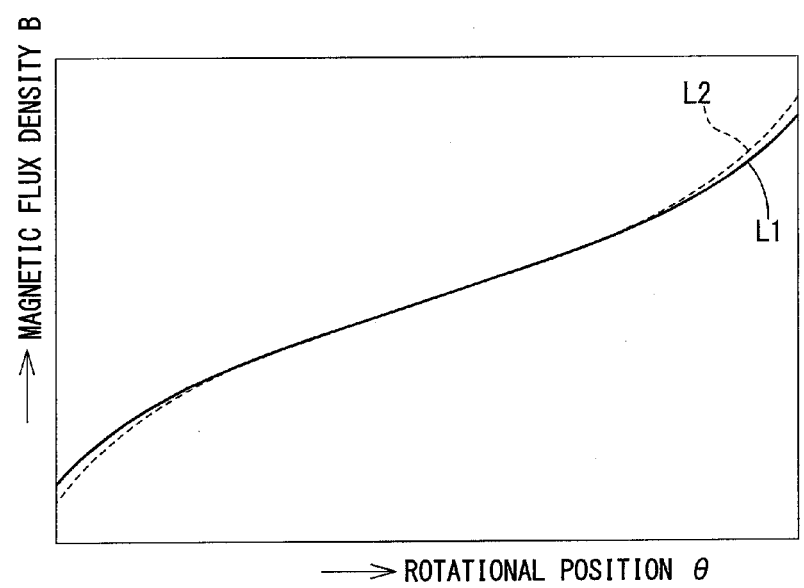
FIG. 3 is a graph showing a relationship between a magnetic flux density passing through a Hall element and a rotational position of an output rotation body of FIG. 2.

FIG. 3 shows, on a Cartesian coordinate system, a characteristics line L1 as a solid line and a characteristics line L2 as a dashed line. The characteristics line L1 shows a relationship between the rotational position (or rotation angle) θ of the output rotating body 108 and the magnetic flux density B passing through the Hall element 25. Further, the characteristics line L2 shows a relationship between the rotation position θ and the magnetic flux density B for a reference example where the width of a gap between yokes in the radial direction is constant along the rotation direction. By comparing the characteristics lines L1 and L2, it is understood that in the present embodiment, increases in the magnetic flux density B is curtailed at the end portions of the detection range of the rotation position θ as compared with the reference example.

As explained above, in the first embodiment, the first opposing surface 31 is formed as a curved surface having a constant radius of curvature R1 and having a center of curvature that lies on the center of rotation AX1. Further, at least the end portions 34 of the second opposing surface 32 in the rotation direction are formed such that toward either end in the rotation direction, the end portions 34 are increasingly spaced away from the reference curved surface BC1 in a direction away from the first opposing surface 31.

As a result of such a configuration, the gap 21 between the yokes is wider at its end portions than at its center in the rotation direction. Thus increases in the magnetic flux density flowing through the Hall element 25 is curtailed at the end portions of the gap 21. Accordingly, the linearity of the output signal from the Hall element 25 is improved.

Further, it is not necessary for the first yoke 11 to protrude outward when widening the end portions of the gap 21. In other words, only the second yoke 12 protrudes in the radial direction. For this reason, it is possible to avoid mounting constraints at the outer side of the rotation position detection device 10, thereby improving mountability.

Further, in the first embodiment, the entirety of the second opposing surface 32, including both end portions 34 in the rotation direction and the center portion 35, is shaped so that toward either end in the rotation direction, the second opposing surface 32 is increasingly spaced away from the reference curved surface BC1 in a direction away from the first opposing surface 31. Specifically, in the first embodiment, the second opposing surface 32 is formed as a curved surface having a constant radius of curvature R2 and having a center of curvature AX2 on the center line CL2. Specifically, the center of curvature AX2 is spaced away from the center of rotation AX1 in a direction toward the first opposing surface 31.

As a result of such a configuration, the second yoke 12 may be easily designed and manufactured with a simple shape.

First Modified Embodiment

Figure 4:
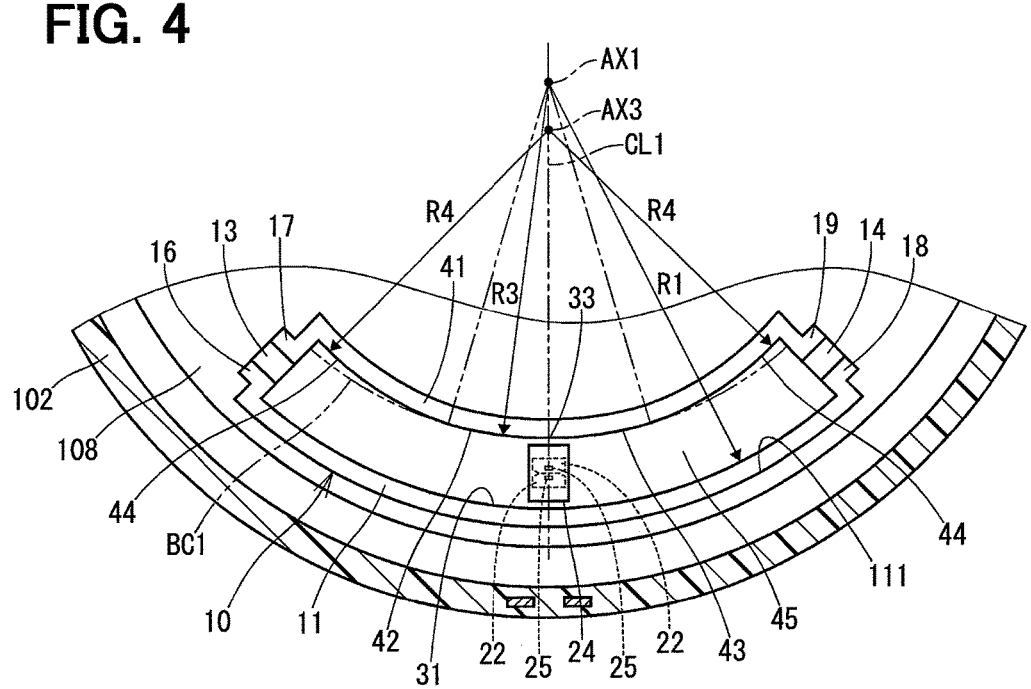
FIG. 4 is a view showing a configuration of a rotation position detection device.

In a modification of the first embodiment, as shown in FIG. 4, a second yoke 41 has a second opposing surface 42 that includes a middle portion 43. The middle portion 43 is formed as a curved surface that has a center of curvature that lies on the center of rotation AX1, and has a constant radius of curvature R3. In other words, in the present embodiment, the middle portion 43 is formed to coincide with the reference curved surface BC1.

The second opposing surface 42 also includes two end portions 44 that are formed such that toward either end in the rotation direction, the end portions 44 are increasingly spaced away from the reference curved surface BC1 in a direction away from the first opposing surface 31. In the present embodiment, the end portions 44 are formed as curved surfaces having a constant radius of curvature R4 and having a center of curvature AX3 on the center line CL1. Specifically, the center of curvature AX3 is spaced away from the center of rotation AX1 in a direction toward the first opposing surface 31.

A gap 45 is defined between the first yoke 11 and the second yoke 41. The end portions of the gap 45 have a width in the radial direction that increases toward either end in the rotation direction. Thus, increases in the magnetic flux density flowing through the Hall element 25 is curtailed at the end portions of the gap 45.

As a result, even if a distance between the center portion 43 of the second opposing surface 42 and the first opposing surface 31 is constant along the rotation direction, as long as the end portions 44 of the second opposing surface 42 are formed so as to be increasingly spaced away from the first opposing surface 31 toward either end in the rotation direction, the linearity of the output signal from the Hall element 25 may be improved similar to the first embodiment.

Second Embodiment

Figure 5:
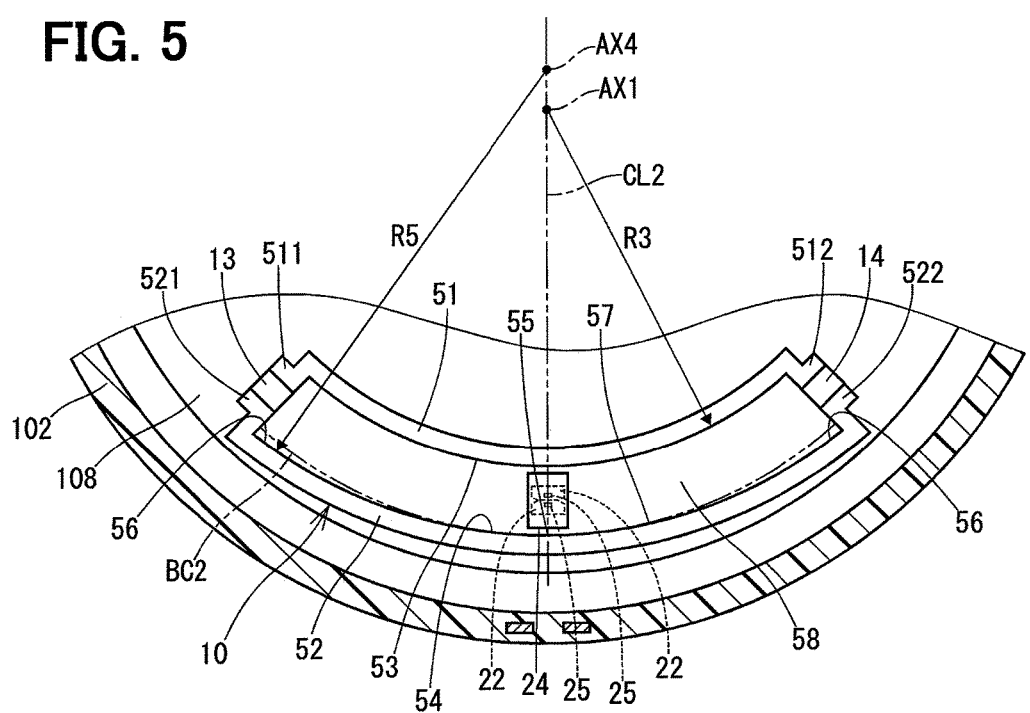
FIG. 5 is a view showing a configuration of a rotation position detection device.

As shown in FIG. 5, in a second embodiment of the present disclosure, a second yoke 52 is disposed radially outward of a first yoke 51. The first magnet 13 is disposed between one end portion 511 of the first yoke 51 and one end portion 521 of the second yoke 52. Further, the second magnet 14 is disposed between an other end 512 of the first yoke 51 and an other end 522 of the second yoke 52. In the following explanation, a reference curved surface BC2 is defined as an imaginary curved surface with a constant radius of curvature that passes through a rotation direction center 55 of a second opposing surface 54. Here, the center of curvature of the reference curved surface BC2 is on the center of rotation AX1. In addition, a center line CL2 is defined as an imaginary line that lies on a cross-section orthogonal to the center of rotation AX1 (e.g., the plane of FIG. 5) and that connects the center of rotation AX1 with the center 55 of the second opposing surface 54.

A first opposing surface 53 is formed as a curved surface having a constant radius of curvature R3 and having a center of curvature that lies on the center of rotation AX1.

The second opposing surface 54 includes two end portions 56 and a center portion 57. The entirety of the second opposing surface 54 is shaped so that toward either end in the rotation direction, the second opposing surface 54 is increasingly spaced away from the reference curved surface BC2 in a direction away from the first opposing surface 53. In the present embodiment, the second opposing surface 54 is formed as a curved surface having a constant radius of curvature R5 and having a center of curvature AX4 on the center line CL2. Specifically, the center of curvature AX4 is spaced away from the center of rotation AX1 in a direction away from the first opposing surface 53.

A gap 58 is defined between the first yoke 51 and the second yoke 52. The gap 58 has a width in the radial direction that increases toward either end in the rotation direction. Thus, increases in the magnetic flux density flowing through the Hall element 25 is curtailed at the end portions of the gap 58.

Accordingly, even if the radial positions of the first yoke 51 and the second yoke 52 are reversed from those of the first embodiment, as long as the end portions 56 of the second opposing surface 54 are formed so as to increasingly space away from the first opposing surface 53 toward either end in the rotation direction, the linearity of the output signal from the Hall element 25 may be improved similar to the first embodiment.

Further, it is not necessary for the first yoke 51 to protrude inward when widening the end portions of the gap 58. In other words, only the second yoke 52 protrudes in the radial direction. For this reason, it is possible to avoid mounting constraints at the inner side of the rotation position detection device 10, thereby improving mountability.

Further, in the second embodiment, the entirety of the second opposing surface 54, including either end portion 56 in the rotation direction and the center portion 57, is shaped so that toward either end in the rotation direction, the second opposing surface 54 is increasingly spaced away from the reference curved surface BC2 in a direction away from the first opposing surface 53. Specifically, in the second embodiment, the second opposing surface 54 is formed as a curved surface having a constant radius of curvature R5 and having a center of curvature AX4 on the center line CL2. Specifically, the center of curvature AX4 is spaced away from the center of rotation AX1 in a direction away from the first opposing surface 53.

As a result of such a configuration, the second yoke 52 may be easily designed and manufactured with a simple shape.

Second Modified Embodiment

Figure 6:
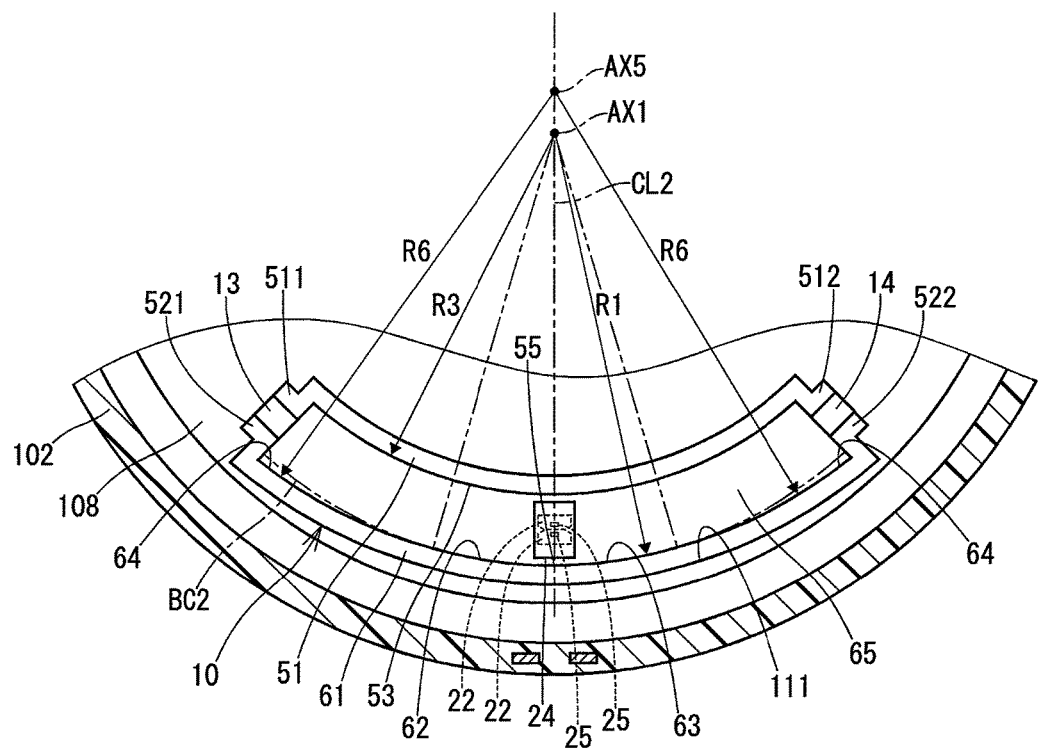
FIG. 6 is a view showing a configuration of a rotation position detection device.

In a modification of the second embodiment, as shown in FIG. 6, a second yoke 61 has a second opposing surface 62 that includes a middle portion 63. The middle portion 63 is formed as a curved surface that has a center of curvature that lies on the center of rotation AX1, and has a constant radius of curvature R1. In other words, in the present embodiment, the middle portion 63 is formed to coincide with the reference curved surface BC2.

The second opposing surface 62 also includes two end portions 64 that are formed such that toward either end in the rotation direction, the end portions 64 are increasingly spaced away from the reference curved surface BC2 in a direction away from the first opposing surface 53. In the present embodiment, the end portions 64 are formed as curved surfaces having a constant radius of curvature R6 and having a center of curvature AX5 on the center line CL2. Specifically, the center of curvature AX5 is spaced away from the center of rotation AX1 in a direction away from the first opposing surface 53.

A gap 65 is defined between the first yoke 51 and the second yoke 61. The end portions of the gap 65 have a width in the radial direction that increases toward either end in the rotation direction. Thus, increases in the magnetic flux density flowing through the Hall element 25 is curtailed at the end portions of the gap 65.

As a result, even if a distance between the center portion 63 of the second opposing surface 62 and the first opposing surface 53 is constant along the rotation direction, as long as the end portions 64 of the second opposing surface 62 are formed so as to be increasingly spaced away from the first opposing surface 53 toward either end in the rotation direction, the linearity of the output signal from the Hall element 25 may be improved similar to the second embodiment.

Other Embodiments

In other embodiments of the present disclosure, the radius of curvature of a first opposing surface or a second opposing surface may be non-constant. Further, a first opposing surface and a second opposing surface are not limited to curved surfaces, and may be formed from a series of planar surfaces connected along the rotation direction instead.

In other embodiments of the present disclosure, a first yoke and a second yoke may have radial cross-section areas that change along the rotation direction.

In other embodiments of the present disclosure, the components that form the closed magnetic circuit (i.e., a first yoke, a second yoke, a first magnet, a second magnet) may be attached to a casing, while a Hall IC may be attached to an output rotating body instead.

In other embodiments of the present disclosure, instead of a first magnet and a second magnet, other types of magnetic flux generators such as electromagnets may be used instead.

In other embodiments of the present disclosure, a rotation position detection device may be attached to other types of rotating components, such as a final speed reduction member of a speed reducer that is disposed between a motor and an output shaft.

The present disclosure is not limited to the above described embodiments, and a variety of embodiments which do not depart from the gist of the present disclosure are contemplated.

The invention claimed is:

1. A rotation position detection device for detecting a rotation position of a detection target that rotates relative to a reference member, comprising:
   a first magnetic flux carrier that extends in a rotation direction of the detection target;
   a second magnetic flux carrier that extends in the rotation direction so as to face the first magnetic flux carrier in a radial direction which is a direction orthogonal to a center of rotation of the detection target, the first magnetic flux carrier and the second magnetic flux carrier being attached together to one of the reference member and the detection target;
   a first magnetic flux generator disposed between one end portion of the first magnetic flux carrier and one end portion of the second magnetic flux carrier;
   a second magnetic flux generator disposed between another end of the first magnetic flux carrier and another end of the second magnetic flux carrier; and
   a magnetic flux density detection unit that outputs a signal according to a magnetic flux density passing therethrough, the magnetic flux density detection unit being positioned in a gap between the first magnetic flux carrier and the second magnetic flux carrier and being attached to another of the reference member and the detection target, wherein
   a first opposing surface of the first magnetic flux carrier is defined as a surface that faces the second magnetic flux carrier and that outlines the gap,
   a second opposing surface of the second magnetic flux carrier is defined as a surface that faces the first magnetic flux carrier and that outlines the gap,
   a reference curved surface is defined as an imaginary curved surface having a constant radius of curvature and having a center of curvature that lies on the center of rotation, the reference curved surface passing through a rotation direction center of the second opposing surface,
   the first opposing surface is a curved surface having a constant radius of curvature and having a center of curvature that lies on the center of rotation, and
   at least both end portions of the second opposing surface in the rotation direction are formed such that toward either end in the rotation direction, the both end portions of the second opposing surface are increasingly spaced away from the reference curved surface in a direction away from the first opposing surface.

2. The rotation position detection device of claim 1, wherein
   an entirety of the second opposing surface, which includes the both end portions and a center portion, is formed such that toward either end in the rotation direction, the second opposing surface is increasingly spaced away from the reference curved surface in the direction away from the first opposing surface.

3. The rotation position detection device of claim 2, wherein
   the second opposing surface is a curved surface having a constant radius of curvature.

4. The rotation position detection device of claim 1, wherein
   a center line is defined as an imaginary line that lies on a cross-section orthogonal to the center of rotation and that connects the center of rotation with the rotation direction center of the second opposing surface,
   a center portion of the second opposing surface, which is in between the both end portions of the second opposing surface, is a curved surface having a constant radius of curvature and has a center of curvature that lies on the center of rotation, and
   the both end portions of the second opposing surface are curved surfaces having a constant radius of curvature and having a center of curvature that lies on the center line and is spaced away from the center of rotation.

* * * * *